US006470346B2

(12) United States Patent
Morwood

(10) Patent No.: US 6,470,346 B2
(45) Date of Patent: Oct. 22, 2002

(54) REMOTE COMPUTATION FRAMEWORK

(75) Inventor: Mark Roy Morwood, Cambridge, MA (US)

(73) Assignee: Millennium Pharmaceuticals, Inc., Cambridge, MA (US)

( * ) Notice: Subject to any disclaimer, the term of this patent is extended or adjusted under 35 U.S.C. 154(b) by 0 days.

(21) Appl. No.: 09/167,821

(22) Filed: Oct. 7, 1998

(65) Prior Publication Data

US 2002/0091695 A1 Jul. 11, 2002

(51) Int. Cl.[7] .............................................. G06F 17/30
(52) U.S. Cl. ....................... 707/101; 709/203; 709/300; 709/303; 710/260; 705/8
(58) Field of Search ................... 707/10, 101; 709/202, 709/203, 102, 300, 303; 705/9, 8

(56) References Cited

U.S. PATENT DOCUMENTS 5,499,364 A * 3/1996 Klein et al. .................. 709/202
5,515,538 A * 5/1996 Kleiman ...................... 710/260
5,727,214 A * 3/1998 Allen .......................... 709/303
5,828,840 A * 10/1998 Cowan et al. .............. 709/203
5,870,746 A * 2/1999 Knutson et al. ............. 707/101
5,881,230 A * 3/1999 Christensen et al. ........ 709/203
5,937,388 A * 8/1999 Davis et al. ..................... 705/8
5,999,911 A * 12/1999 Berg et al. ....................... 705/9
6,094,655 A * 7/2000 Rogers et al. ................ 707/10
6,098,111 A * 8/2000 Maegawa et al. ........... 709/300
6,125,382 A * 9/2000 Brobst et al. ............... 709/102
6,223,217 B1 * 4/2001 Pettus ......................... 709/219
6,351,574 B1 * 2/2002 Yair et al. ................... 382/321
2001/0047385 A1 * 11/2001 Tuatini ........................ 709/203

OTHER PUBLICATIONS

Duval, Gregory, "Specification and Verification of an Object Request Broker," Int. Conf. on Software Engineering, ACM, pp. 43–52, Apr. 19, 1998.*

* cited by examiner

Primary Examiner—Charles L. Rones
(74) Attorney, Agent, or Firm—Fish & Richardson P.C.

(57) ABSTRACT

A computer system includes a computation process. The computation process includes a client process to produce a computation request with the computation request being invoked by a command line executable. The system also includes a server process to process the computation request. The server process includes a remote computation manager process to manage computations and a dispatcher process responsive to the computation request, to invoke the remote computation manager process.

12 Claims, 6 Drawing Sheets

REMOTE COMPUTATION FRAMEWORK

COMPUTER PROGRAM LISTING APPENDIX

This specification herein incorporates by reference one compact disc entitled "Ser. No. 09/167821, REMOTE COMPUTATION FRAMEWORK, COMPUTER PROGRAM LISTING APPENDIX", which contains a computer program listing appendix. The compact disc contains one file. The file is named "APPENDIX.TXT", has a creation date of Mar. 1, 2002, and is 17,591 bytes in size.

BACKGROUND

This invention relates generally to distributed computer systems.

Certain types of applications are complex and can benefit from off-loading computationally expensive algorithms to powerful compute servers. Bioinformatics applications are one type of class of applications which involve the consumption of large amounts of memory and processing time. Generally, such applications can be executed on a remote server from invocation at a client. However, this generally requires that the client or more particularly the user at the client system know the server name and often the path to invoke the remote application.

SUMMARY

This invention resides in a remote computation system to enable a requesting client to invoke a computation on a remote server. The invention allows the client to invoke any arbitrary command-line on the remote server. The remote computation process dispatches computation requests received from clients to appropriate computation servers, manages the computation requests and allows vending or gathering of results that are sent back to the requesting client.

According to an aspect of the invention, a computer system includes a computation process. The computation process includes a client process to produce a computation request with the computation request being invoked by a command line executable. The system also includes a server process to process the computation request. The server process includes a remote computation manager process to manage computations and a dispatcher process responsive to the computation request, to invoke the remote computation manager process.

The invention includes one or more of the following advantages.

The remote computation process of the present invention allows easy invocation of remote computations. The remote computations are invoked as command line executions. The invention simplifies execution of remote computations, by providing location transparency, that is, the user of the remote computation process does not need to know where the computation is actually executed. In addition, the remote computation process also provides status monitoring of the computations. The remote computation process allows the user to off-load computer/intensive applications to compute servers that are appropriate for the computation. The remote computation system includes a computation dispatcher that determines an appropriate server on which to execute a particular application. For applications in which data are stored remotely, this remote computation system can be used to move the computation closer to the source of data used in the computation. In addition, the remote computation process can provide for batch computation processing to permit users to continue working on other problems rather than waiting for computations to be finished locally.

Unless otherwise defined, all technical and scientific terms used herein have the same meaning as commonly understood by one of ordinary skill in the art to which this invention belongs.

Other features and advantages of the invention will be apparent from the following detailed description, and from the claims.

DETAILED DESCRIPTION

Figure 1:
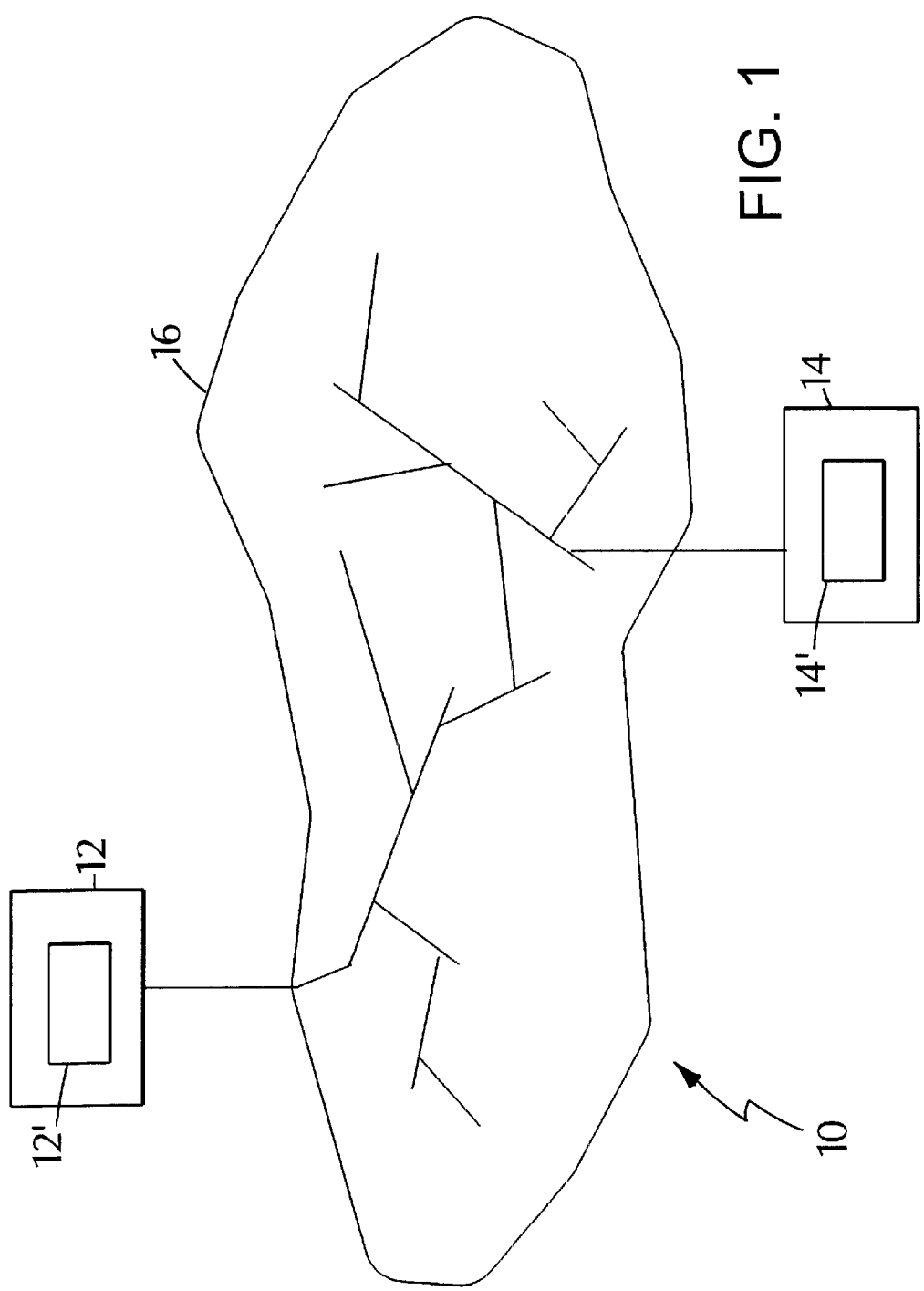
FIG. 1 is a block diagram of a client-server computer system.

Referring now to FIG. 1, a client-server computer system 10 is shown. The client-server computer system 10 includes at least one client computer 12 having a client process 12'. The client process 12' is described in detail in FIG. 4. The client computer 12 can be coupled to at least one server computer having a server process 14'. The client 12 is coupled to the server computer 14 via a network 16 which may include the Internet, a wide area network, local area network intranet and so forth. Other types of connecting arrangements could be used. Although a single client computer 12 is shown, the client-server system 10 can have a large number of client computers connected to a large number of server computers by network 16. Moreover, the client process 12' and server process 14' could alternatively be executed in the same computer.

Figure 2:
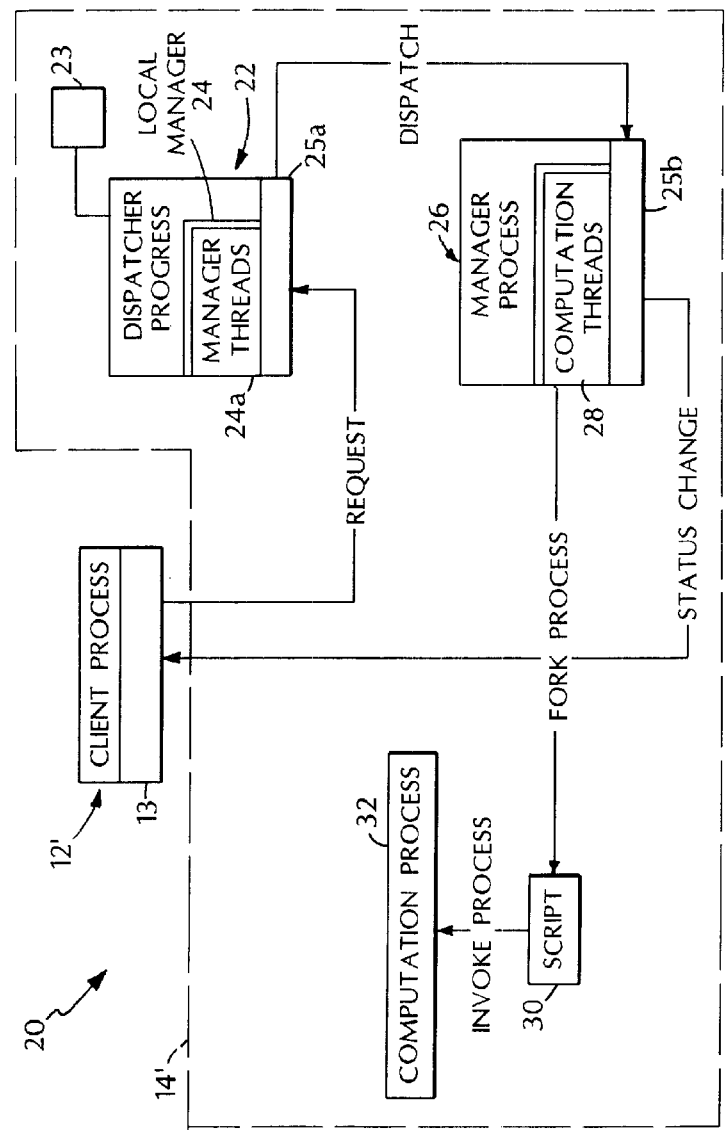
FIG. 2 is a block diagram of a remote computation system in the client-server computer system of FIG. 1.

Referring now to FIG. 2, a remote computation process 20 that permits a client process 12' to transparently invoke a computation process on a server process is shown. The remote computation process 20 includes the client process 12' that sends a "Computation Request" to the server process 14'. The Computation Request is received by a dispatcher process 22 running on the server 14'. The dispatcher process 22 determines which manager to send the request to and dispatches the computation request to a manager process 26. Note that a manager process 26 can be run either as a thread 24*a* within the dispatcher process itself (i.e., a "local" manager, 24) or as an independent process (i.e., a "remote" manager, 26). The manager process 26 produces the computation thread 28 that forks a process to invoke a command line. The command line is usually a script 30 which invokes the desired application program 32. However, the use of a script is not necessary—the computation thread could invoke the computation process directly. The computation process 32 can be executed on the server 14 or other servers (not shown).

The client process 12' communicates with the server process 14' via an interface 13 defined using the CORBA Interface Definition Language (IDL). The client process 12' communicates with the server process 14' interfaces 25a and 25b. The server process 14' includes an interface to the dispatcher 25a and an interface to the manager 25b.

The client process 12' can be implemented in VisualWorks®, by ObjectShare, 16811 Hale Ave Suite A, Irvine, Calif. 92606. Note that the client process 12' could be implemented in other versions of Smalltalk or in other languages. The client interface can be implemented using either Orbix® Smalltalk, IONA Technologies plc, The IONA Building, 8–10 Lr. Pembroke St., Dublin 2, Ireland, or SmalltalkBroker®, DNS Technologies, Inc., 160 Spear St., Suite 320, San Francisco, Calif. 94105. The client interface could be implemented using any Smalltalk CORBA object request broker.

The server process 14' (i.e., the dispatcher process 22 and manager process 26) can be implemented using C++, but they could be implemented in other languages. The server interfaces 25a and 25b can be implemented using the Orbix® C++CORBA object request broker, IONA Technologies plc, The IONA Building, 8–10 Lr. Pembroke St., Dublin 2, Ireland. However, the server interfaces 25a, 25b could be implemented using any C++CORBA object request broker.

DATA STRUCTURES

The Computation Request is defined by a CORBA struct referred to as a ComputationDescriptor. The ComputationDescriptor struct has eight fields:

application
cleanUpApplication
applicationVersion
args
type
requestingUser
requestingApplication
priority These fields are discussed below in further detail. The "application" field is a string that contains the name of the executable to be run on the server 12. The application field is used by the remote computation system to construct the command-line on the server 12. The dispatcher process 22 also uses the "application" field to determine which manager to forward the request to.

The "cleanUpApplication" field is reserved to hold the name of an application to call after the computation has been run. The "cleanUpApplication" performs any necessary cleanup for the application (for example, deleting log files).

The "applicationversion" field is a structure that is used to describe which version of the application is being requested. The "applicationversion" is a structure of type "Version", that contains two short integer fields, named major and minor. This applicationversion field is used in the dispatcher process 22 so that the remote computation system could be configured with different managers for different versions of an application.

The "type" field is a string that is used by the dispatcher process 22 to determine which manager process 26 to forward the request to. The type field can be used to group similar applications together so that they can be dispatched as a group. For example, consider a system with four applications, two of which are analysis applications (called "Analysis-App_1" and "Analysis-App_2") and two of which are database loading applications, (called "Loader-App_1" and "Loader-App_2"). The system can be configured to send all analysis requests to one manager process (Manager-1) and all database loading requests to a different manager process (Manager-2). Two different types, "analysis" and "databaseload" can be defined. Requests for Analysis-App_1 and Analysis-App_2 would have their "type" fields set to "analysis" whereas requests for Loader-App_1 and Loader-App_2 would be set to "databaseload".

The "requestinguser" field is a string containing the name of the user who is requesting the computation. The "requestingApplication" field is a string containing the name of the application that is sending the computation request. The dispatcher process 12 uses this field to determine which manager to forward the request to.

The "priority" field is an enumerated type that represents the priority that the requester has placed on the computation request. Its possible values are "DontCare", "Low", "Med", "High", and "Critical". The dispatcher process 12 uses this field to determine which manager to forward the request to, whereas the manager process 26 uses this field to determine the order in which it will execute requests. Higher priority requests are executed before lower priority requests.

The "args" field is a collection of args that is used to describe the inputs and outputs to the computation. The "args" field is of type "ArgList". An ArgList is a collection of Arg. An Arg is a union of one of the following:

OptionArg
ContentInputArg
StdinInputArg
FileInputArg
ContentOutputArg
FileOutputArg These arguments are described below in more detail.

An "OptionArg" is a string that is to be placed on the command line. The remote computation system 20 need not understand the semantics of the contents of this string—instead it simply places it on the command line.

A ContentInputArg is used to pass a string from the client process 12' to the command-line executable. The remote computation system 20 creates a temporary file (not shown) on the server 14, populates the file with the string, and places the name of the file on the command line. The system deletes the file once the computation has been completed.

The "ContentInputArg" is a structure that contains four fields: "prefix", "fileContents", "filePrefix", "fileSuffix". The prefix is an optional string that can be placed on the command line before the name of the temporary file. The "fileContents" is the data string itself. The "fileprefix" is an optional prefix that is the beginning of the filename. The fileSuffix is an optional suffix that is the end of the filename.

A "FileInputArg" is similar to the "ContentInputArg" in that it is used to specify an input file for the executable. However, the "FileInputArg" is used to specify a file that is already on the server 14. "FileInputArg" is used to name which file to use, rather than to pass data from the client 12 to the server 14. The "FileInputArg" is a structure which contains two fields: "prefix and pathName".

The "prefix" is an optional string that can be placed on the command line before the name of the file. The "pathName" is of type "FilePath" and is used to specify the location of the file in a system independent fashion.

A FilePath is a structure that contains two fields: root and components. The "root" field is an enumerated type that specifies where the path starts. The root field can have values "relative" (that means it starts from a current directory or folder), "absolute" (that means it starts from the highest level), or "home" (that means it starts in the home directory of the user who is running the manager). The "components" field is a sequence of strings that represent the names of the directories or folders.

The StdinInputArg is also used to pass a string from the client to the executable. However, it is used when the executable is expecting to read the string from standard input.

The remote computation system 20 provides a temporary file on the server 14 and populates it with the data string passed by the client 12. The remote computation system 20 pipes the contents of the temporary file to the executable. The remote computation system 20 deletes the temporary file when the computation is complete. The "StdinInputArg" is a struct that contains two fields: "prefix" and "stdinContents". The "prefix" is an optional string that is put on the command-line prior to piping in the data. The "stdinContents" is a string that contains the actual data.

The "ContentOutputArg" and "FileOutputArg" are used to define to the remote computation system 20 where the executable will place its output. The remote computation system 20 needs to know where the executable will place its output so that it can vend the contents of the output to the client process 12'. The "ContentOutputArg" is used when it is possible to tell the executable the name of the file that it should use to put its data in.

The "ContentOutputArg" is a struct that contains four fields: "name", "contentPrefix", "filePrefix", and "fileSuffix". The "name" field is a string that will be used to identify the results, so that the client 12 can ask for the results by name. The "contentPrefix" is an optional string which will be placed on the command line before the name of the temporary file. The "fileprefix" is an optional prefix that will be the beginning of the filename. The "filesuffix" is an optional suffix that will be the end of the filename.

The "FileOutputArg" is used when it is not possible to tell the executable the name of the file that it should use to put its data in. Many executables write their data to a file with a particular name—the "FileOutputArg" handles this type of situation.

The "FileOutputPrefix" is a struct that contains five fields: "name", "filePrefix", "pathName", "includeFilename", "deleteFile". The "name" field is a string that will be used to identify the results, so that the client can ask for the results by name. The "fileprefix" is an optional string that will be placed on the command line before the name of the file. The "pathName" is of type "FilePath" and describes the location of the file. The "includeFilename" is a boolean expression that tells the remote computation system 10 whether to include the filename on the command-line. The "deleteFile" is a boolean expression which tells the remote computation system whether to delete the file once the computation has been completed.

As described above, the "ComputationDescriptor" contains a collection of arguments which are of the type shown above. Thus a computation request could contain any arbitrary combination of "OptionArg", "ContentInputArg", "StdinInputArg", "FileInputArg", "ContentOutputArg", and "FileOutputArg". The order in which these arguments are placed on the command line is determined by the order in which the client process 12' puts them into the sequence. That is, the first argument in the sequence of Args will be the first argument on the command line.

DISPATCHER PROCESS

The dispatcher process 22 directs a computation request from the client process 12' to an appropriate manager process 26. The dispatcher process 22 directs the computation request by examining a set of rules that the dispatcher process 22 reads from configuration files 23 on start-up. The dispatcher process 22 can also be reconfigured while running. These rules are used by the dispatcher process 22 to determine which manager computation process 26 is appropriate for the request.

The IDL interfaces used by the remote computation system 20 are described in detail in attached Appendix I which is incorporated herein by reference.

The process by which computation requests are dispatched to remote managers and the rules which are used to determine the appropriate manager for a request are invisible to the user. That is, when a user invokes a computation request, the user does not need to know which manager will be used to service that request, nor does the user need to know which machine that manager is running on. The advantage of this transparency is that an administrator can change the configuration of the server 14 (by changing the dispatch rules and/or changing the number and configuration of the managers) 10 without having to change the client process 12' or change the way that the users use the client 12.

The rules used by the dispatcher process 22 are maintained in a text file that is read during start-up of the dispatcher process 22. The dispatcher process 22 reads in the rules and creates an internal representation of the rules. When dispatching a computation request, the dispatcher process 22 evaluates each rule in turn until one of the rules answers true. The rules are evaluated in the order in which they appear in the rules file. That is, the first rule in the rules file is evaluated first, the second rule in the file is evaluated next, etc.

The dispatcher process 22 is in a loop waiting for clients to issue computation requests. The primary request the client 12 issues to the dispatcher process 22 is to perform a computation. Based upon the dispatch rules, the dispatcher process 22 delegates the creation of an actual computation request to an appropriate manager process 26.

Rules are either assignment statements or mapping rules. Assignment statements simply associate expressions with variable names that can be used in later rules. Mapping rules map manager names to expressions.

The grammar for the rules is shown below.

```
    ruleSet     : assign
              | rule
              | ruleSet assign
              | ruleSet rule
    assign      : name ASSIGNOP exp SEMICOLON
    rule        : name RULEOP exp SEMICOLON
    exp         : var
              | bool
              | boolExp
              | unaryExp
              | intExp
              | stringExp
              | LPAREN exp RPAREN
    boolExp     : exp BOOLOP exp
    unaryExp    : UNARYOP exp
    intExp      : var INTOP INTEGER
    stringExp   : var STRINGOP string
    var         : name
    bool        : TRUEVAL
              | FALSEVAL
    name        : NAME
    string      : STRING
    // lex from rules.1
    "<"         INTOP - LESS
    "<="        INTOP - LESSEQUAL
    "="         INTOP - EQUAL
```

-continued

```
">="     INTOP - GREATEREQUAL
">"      INTOP - GREATER
"=="     STRINGOP - STRINGEQUAL
"~="     STRINGOP - STRINGMATCH
"!"      UNARYOP - NOT
"&"      BOOLOP - AND
"|"      BOOLOP - OR
"("      LPAREN
")"      RPAREN
":="     ASSIGNOP
"<-"     RULEOP
";"      SEMICOLON
[tT][rR][uU][eE]          TRUEVAL
[fF][aA][lL][sS][eE]      FALSEVAL
[a-zA-Z][a-zA-Z0-9\-_\.]* NAME
[0-9]+                    INTEGER
\"[^\"]*\"                STRING
[\t\n]                    // ignore whitespace
\#.*\n                    // ignore comments
```

A "ruleSet" is a series of rules and assigns. Both rules and assigns are terminated by semicolons ";". An assign is a variable name followed by an assignment operator ":=" followed by an expression followed by a semicolon. It has the effect of assigning the value of the expression to the variable. The variable may be used in the following expressions. Expressions are evaluated in the order in which they appear in the rule set.

A rule is a manager name followed by a rule operator "<-" followed by an expression. When a ruleset is evaluated, as soon as the expression associated with a rule evaluates to true, the evaluation of the ruleset terminates and the result is the name of the manager associated with the rule that evaluated to true. Expressions may be variables, booleans ("true" or "false"), boolean expressions, unary expressions, integer expressions or string expressions. Parenthesis ("(" and ")") may be used to group expressions.

The different types of expressions are distinguished by the types of the operands and the operators. There is no type conversion. The type of any operands thus matches the type of the operator.

The integer operations LESS "<", LESSEQUAL "<=", EQUAL "=", GREATEREQUAL ">=" and GREATER ">" have the standard integer meanings.

The string operation STRINGEQUAL "==" returns true if the strings match exactly.

The string operation STRINGMATCH "~=" returns true if the left hand arg matches the regular expression on the right hand side. Note the regular expressions are standard Unix regular expressions not file expansion expressions.

The unary operation NOT "!" and the binary operations AND "&" and OR "|" have their normal boolean operation meanings.

The following is an example set of rules demonstrating the different rules and expressions.

```
# Example rules

# set the variables "isMark" and "isLong" for later use
isMark := requestingUser ~= "mark.*";
isLong := type == "long";

# any jobs whose attributes evaluated to long and mark go to
# manager "mgr1"
mgr1 <- isMark & isLong;

# we define a variable for Urgent jobs
isUrgent := (prio > 3);

# the following statements test the comment character
okexp := user == "asd#fgh";
ok2exp := size < 10; # a trailing comment

# the following would cause an error because it has an undefined
# variable
# badExp := xxxxVar > 0;

# mapping rules for mgr2, mgr3 and mgr4
mgr2 <- isMark & isUrgent & ( application == "testApp");
mgr3 <- isLong | isUrgent;
mgr4 <- true;
```

Descriptor Attributes

The following are the standard attributes that may be used in a rule that are made available from a computation descriptor.

application (string)
majorVersion (integer)
minorVersion (integer)
requestingUser (string)
requestingApplication (string)
priority (integer)
type (string)

MANAGER PROCESSES

Manager processes are responsible for managing a set of computation objects. While there is generally one dispatcher process 22 within the remote computation system 20, there can be one or a plurality of manager processes 26 for a given computation system 20. Manager processes 26 can be run as a local manager thread 24 or a remote manager process 26. When run as a local manager thread 24, it is run as a separate thread within the dispatcher process 22.

Figure 3:
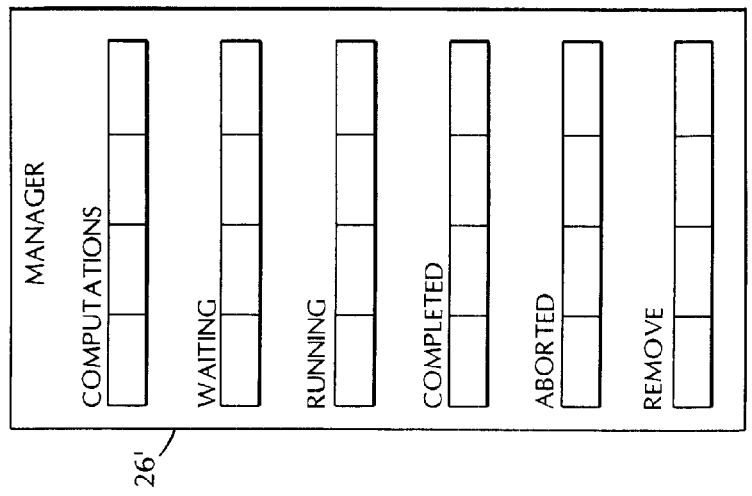
FIG. 3 is a block diagram of a manager process.

The dispatcher invokes the manager by sending messages using the IDL interface to the manager. The dispatcher process 22 delegates a client's computation request to an appropriate manager process 26 by invoking the manager's implementation of the createcomputation ( ) method. The manager process 26 creates a computation object for the request and puts the computation object in the manager's "waiting" queue (FIG. 3). When the manager process 26 determines it can have another computation running, it selects the highest priority computation from its "waiting" queue and sends a message to the computation to cause the computation to execute.

The computation object creates a thread for its execution. This thread performs a fork and exec to start up a command line. The command line is usually a Perl script. Perl is freely distributed under the GNU Public License. The Perl script is static, that is, it is not generated at runtime. Rather, it is written ahead of time. Usually, there is one Perl script dedicated to invoking each different executable. The Perl script in turn calls the actual computation process 32. The computation object creates a thread for its executable. The computation object collects the results of the executable and supplies these results directly to the client process 12' as will be described.

The Perl script process is an optional process that is used to invoke the computation. The Perl script process encapsulates the computation process. This permits subsequent modification of the processing of the application without changing the underlying application executable. The encapsulation provided by the script process isolates the manager process 26 and dispatcher process 22 from further changes in computation processing. The computation executable could, however, be invoked directly by the manager process 26 bypassing the Perl script.

The client process 12' sends the computation request to the dispatcher 22. The dispatcher 22, forwards the request to the manager process 26. The manager process 26 creates a computation object for each computation request. The manager process 26 manages these computations by maintaining them in a set of queues.

Referring now to FIG. 3, a queue structure 26' manager process 26 (FIG. 2) is shown. The manager process 26 maintains one queue called "Computations" that contains all computations that are currently active in the manager 26. Each computation is also in a single other queue, depending upon the computation's state. The manager controls the number of computations of a given type that are run simultaneously and maintains the set of computations in various queues corresponding to an object's state, i.e., "waiting", "running", "completed", "aborted" and "removed". The manager process moves computation objects between " waiting", "running", "completed", "aborted" and "removed" queues as their status changes.

Once the manager process 26 creates a computation object for a client computation request, the client process is given an interoperable object reference (IOR) to communicate directly with the computation, as will be described.

The remote computation system 20 provides the ability to create client applications that access the remote computation servers with minimal effort.

Figure 4:
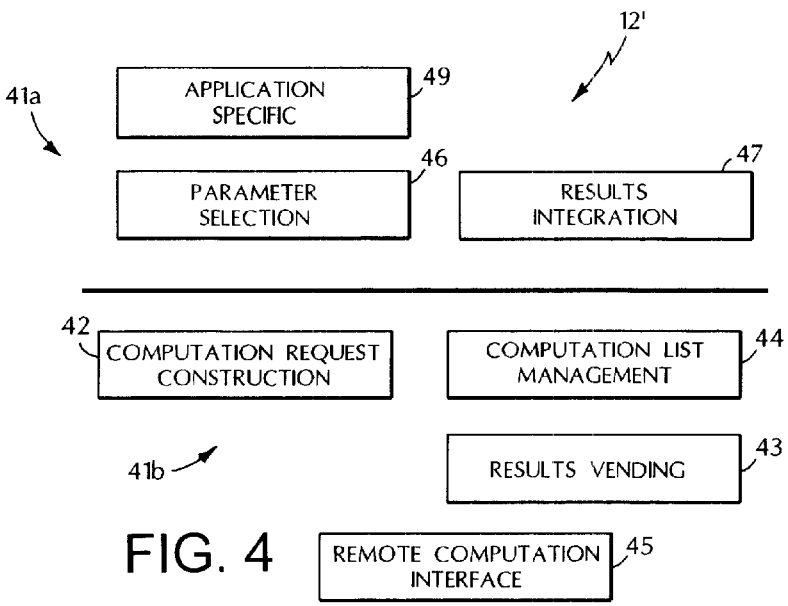
FIG. 4 is a block diagram of a client process used in the system of FIG. 1.

Referring to FIG. 4, the client process 12' includes an application layer 41a and an infrastructure layer 41b. The application layer 41a is specific to the client application. The infrastructure layer 41b is the client portion of the remote computation system 20 and it provides the services of the remote computation system 20 to the client. Example types of applications that can use the remote computation system 20 include an application that loads genotype data into a database by calling a remote application to perform the database loading.

Applications 49 can use the remote computation system to execute genetic analysis tools on remote application servers 14. The application layer includes parameter selection 46 and results integration 47 interfaces.

The infrastructure layer 41b includes a computation request constructor 42 that receives a computation request from the application layer 41a and creates a Computation-Descriptor (described previously) and populates its fields appropriately from the application layer's computation request. The infrastructure layer 44 calls the dispatcher process 22 createcomputation method, using the ComputationDescriptor as an argument, via a remote computation interface 45.

The infrastructure layer 41b provides a results vending interface 43 that allows the application to get the entire contents that the computation executable wrote as a standard output as a string using a single call.

In addition, the infrastructure provides an optional ComputationListManagement interface 44 that the application can use to simplify the management of multiple computation requests. It provides operations on the set of pending computation requests, like removeAllCompletedComputations, etc.

OBJECT MANAGEMENT

Referring now to FIGS. 5–10, management processes 26 for remote computation creation 60, invocation 70, state change 80 and results gathering 90 are shown.

Figure 5:
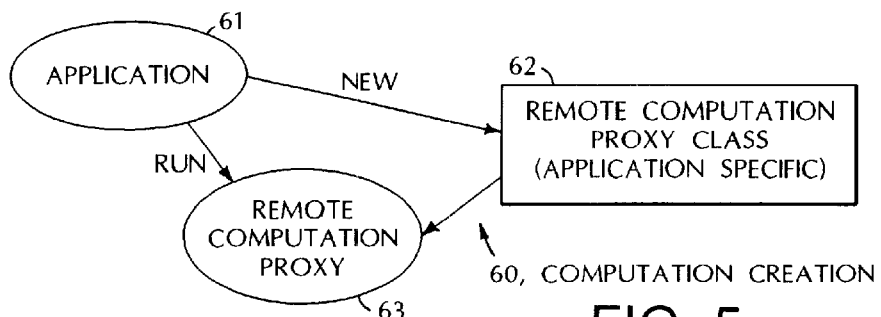
FIG. 5 is a block diagram of a process to create computation request objects in the client process.

Referring to FIG. 5, a computation creation object 60 is provided by the remote computation system 20. A user selects appropriate parameters for their request. These parameters are unique to each application that will be executed. The application 61 in the client process 12' sends a computation creation message to a subclass of Remote Computation Proxy 62. There is a unique Remote Computation Proxy subclass for each unique command-line executable which the remote computation system 20 will execute.

The creation message contains the parameters needed for the request, and is thus unique to each Remote Computation Proxy class. The Remote Computation Proxy class creates a new instance of itself and returns the new instance. The application 61 tells the Remote Computation Proxy 63 instance to run. The application 61 in the client process 12' sends a message to a class of computation brokers 62 to generate as many computation objects 63 as are appropriate for a particular configured, remote computation. The computation broker creates a new instance of the application specific computation based upon the parameters selected.

Figure 6:
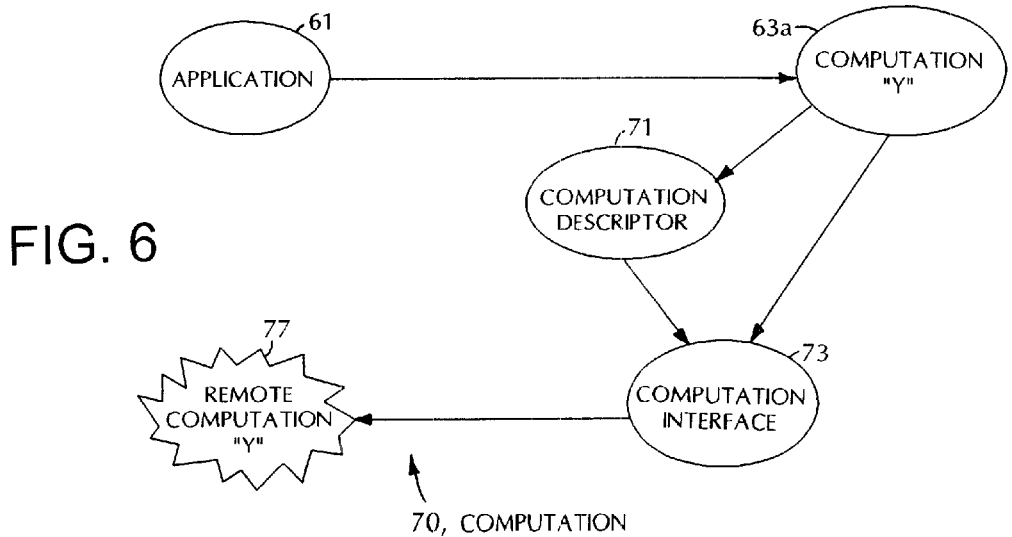
FIG. 6 is a block diagram of a process to invoke computation requests in the client process.

Referring now to FIG. 6, when the user determines that it is time to invoke a computation on a server 14, the application 61 sends the "run" message to remote computation proxy object 63a. In response the remote computation proxy object 63a will execute its computation. The remote computation proxy object 63a sends a request message to the Computation Interface 73. The Computation Interface 73 creates a Computation Descriptor object using the arguments passed in the request message. The Computation Interface 73 hooks up a Computation Descriptor 71 to the remote computation proxy 63a. The Computation Descriptor 71 contains all of the arguments needed for the execution of the computation. The Computation Interface 73 also creates a Notify object 75 (FIG. 7) and hooks that up to the Remote Computation Proxy 63a as well.

The Computation Interface 73 calls the createComputation method on a dispatcher process 22, using the Computation Descriptor 71 and Notify 75 objects as parameters. The CORBA ORB tools translates the arguments from Smalltalk into CORBA compliant TCP/IP packets to send to the dispatcher process 72. The dispatcher process 22 delegates the request to an appropriate Manager process 26 by calling the Manager's createComputation request. The Manager creates an instance of a Computation 77, and returns an Interoperable Object Reference (IOR) for the Computation 77 to the Remote Computation Proxy 63a.

When the call is returned, the Remote Computation Proxy object 63a has an IOR or handle to the Computation object 77, which resides on the server 14 inside the Manager process 26. The Remote Computation Proxy object 63a can now use this handle to communicate directly with the Computation object 77.

Figure 7:
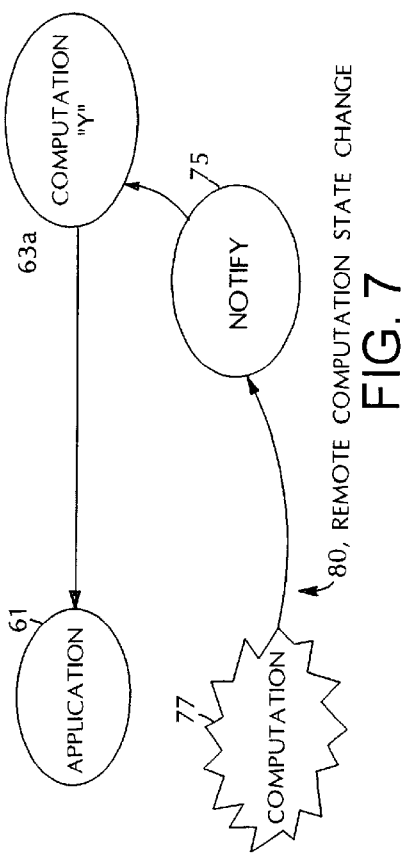
FIG. 7 is a block diagram of a process to change the state of a remote computation in the client process.

Referring now to FIG. 7, when the computation changes execution state 80, i.e., from a queued "wait" state to a queue "running", "completed", "aborted" or "removed" state, it sends its execution status and an update message "Notify Object"75. The Notify Object 75, in turn, tells the Remote Computation Proxy object 63a that the state of the remote computation has changed. Through standard VisualWorks SmallTalk® dependency mechanisms, the remote computation proxy object informs the application or more properly the particular application shell 45 (FIG. 4) that a state change has occurred. The particular application shell 45 takes an appropriate action which may be to do nothing, cause the update of any graphical user interface or dependent objects interested in the status of the computation.

Figure 8:
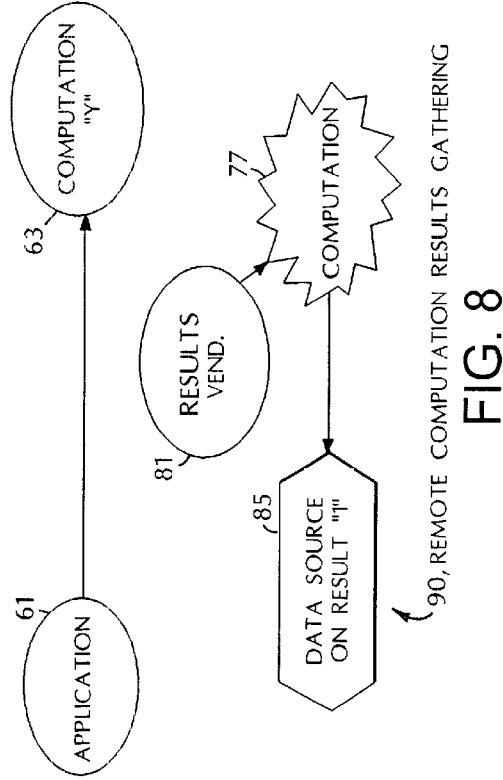
FIG. 8 is a block diagram of a process to vend results of a remote computation.

Referring now to FIG. 8, under user control or automatically in the application process when it is time to gather 90 results of a remote computation that has successfully executed, the application 61 asks the Remote Computation Proxy object 63 for its ResultsVendor. The application 61 asks the ResultsVendor 81 for its results. The application 61 can request the text that the command-line executable wrote to standard output (STDOUT) or the text that the command-line executable wrote to standard error (STDERR). If the command-line executable wrote to a particular file, then the application can request the contents of that file if the Remote Computation Proxy created command-line parameters using either a ContentOutputArg or FileOutputArg (as discussed above). The application would request the contents of the file using 85 the name of the data source, which would have been specified when the ContentOutputArg or FileOutputArg were created.

Figure 9:
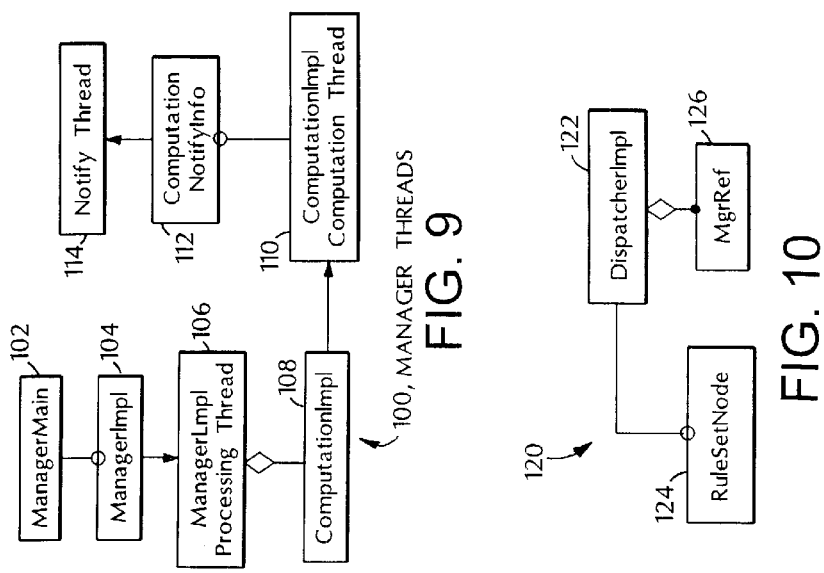
FIGS. 9–16 are block diagrams of hierarchial processes used in a remote computation manager.

Referring now to FIG. 9, the structure of the remote manager 26 is shown. When a remote manager 26 is started, the main function, ManagerMain 102, creates an instance of ManagerImpl 104 and causes ManagerImpl to start processing. ManagerImpl 104 is an instance of the ManagerImpl class and invokes ManagerImplProcessingThread 106 which creates a thread and starts a processing loop (not shown). The processing loop handles requests from the client process 12', When the remote manager is ready to exit such as by spawning a computation object, the ManagerImpl thread is signaled to exit. The ManagerImpl thread waits for its processing thread to exit. Therefore, the remote manager normally has two threads running, the main thread or executable and the ManagerImpl processing thread.

When the manager receives a computation request, it creates an instance of ComputationImpl 108 and places the ComputationImpl 108 instance in a waiting queue. When the manager is ready, it tells the ComputationImpl 108 to start processing. When the ComputationImpl is signaled to start processing, it creates a separate thread ComputationImplComputationThread 110 to invoke a computation executable. The use of the separate thread, ComputationImplComputationThread 110, permits computations to run in parallel rather than blocking the ManagerImpl 104. The ComputationImplComputationThread 110 is created as a detached thread that permits the ComputationImpl object to remain active even after it has completed the computation. This permits the client process 12' to receive results at any point after the computation has completed. The ComputationImpl computation thread is only created when the computation starts running. Once the computation is complete, the thread ends, conserving system resources such as memory.

The computation object 77 (FIG. 6) notifies the client process 12' when its status changes. The computation object 77 notifies the client in such a manner that the computation will run to completion even if errors occur during notification. For example, it is possible that the client 12 may be unresponsive for various reasons. For example, the user could have exited the client process 12', the client 12 could have crashed or a network problem could have made the client 12 unreachable. The computation object 77 creates an instance of ComputationNotifyInfo 112. The ComputationNotifyInfo object 112 creates a detached NotifyThread 114 that performs the notification. In this manner, if there is an error in the notification process it should have little impact upon the computation itself.

The notification thread calls a CORBA one-way method on the client 12 to notify the client 12 of the status change. CORBA one-way calls do not block the server 14 calling process while the caller processes the method. Thus, the Manager 26 will not block the computation even if the client 12 does not properly handle the notification.

Figure 10:
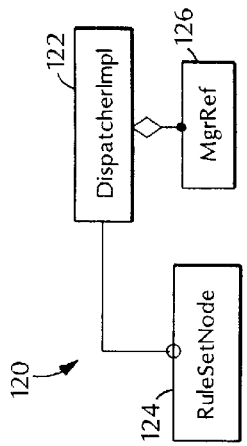

Referring now to FIG. 10, a dispatcher object hierarchy includes a DispatcherImpl 122 class that holds a single rule set "RULESETNODE" 124 that is the root level of dispatch rule objects (not shown). The DispatchImpl 122 maintains a collection of MgrRef objects 126 that are references to manager processes 26. These MgrRef objects 126 may refer to remote or local managers.

Figure 11:
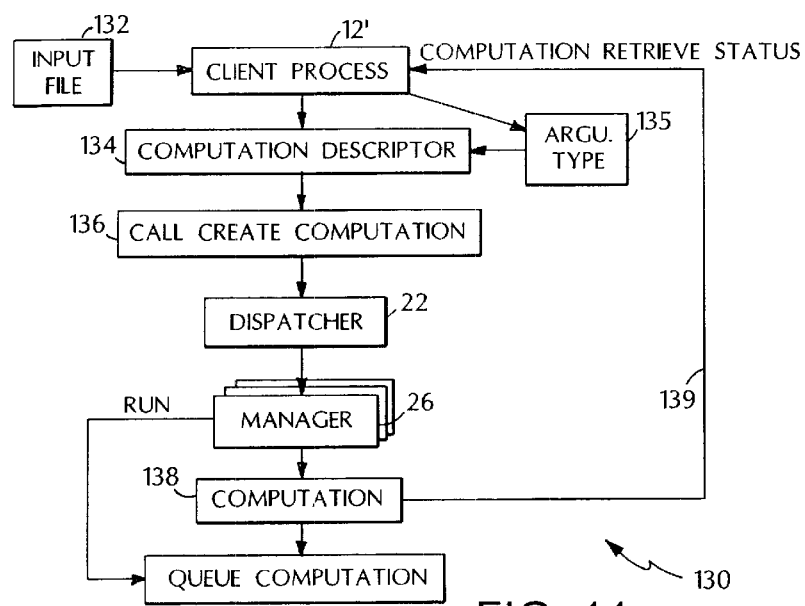

Referring now to FIG. 11, a CreateComputation process 130 to permit a client process 12' to execute a computation is shown. The client process 12' selects a type of computation to execute. The client process 12' allows the user to select an input file 132 that would be an argument for the computation. The client process 12' creates a computation descriptor 134 of the appropriate argument type 135. The client process 12' calls the CreateComputation 136 on the dispatcher process 22 with the computation descriptor as an argument.

The dispatcher process 22 dispatches the create computation request to the appropriate manager 26, and the manager 26 creates a computation 138 and places the computation object on the waiting queue. The computation reference 139 is returned to the client 12. When the size of the manager's running queue becomes less than its maximum number of concurrent computations, the manager process 26 places the computation object in its running queue, causing the computation object to start. The computation object notifies the client process 12' that its state has changed to "RUN" and starts running. When the computation object completes, it notifies the manager process 26 and the client process 12' that its state has changed to "complete". The manager process 26 moves the computation to its completed queue and the client process 12' can request vending of results from the computation. A user can hit a remove button on a client interface (not shown) to send a remove message to the computation. The computation manager 26 removes the computation object by moving the computation object to its remove queue. During a clean-up process, the manager can purge the contents of its remove queue, to complete removal of the computation object.

Figure 12:
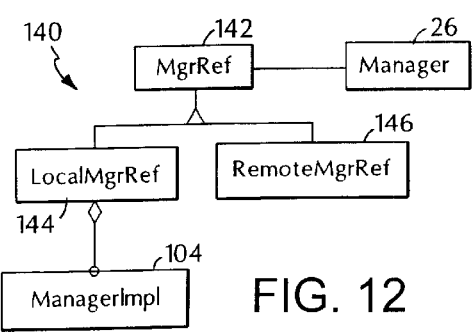

Referring now to FIG. 12, a hierarchy 140 of the manager references 26 is shown. The manager references are used by the dispatcher to maintain its list of managers. The hierarchy 140 includes a MgrRef 142 that is a reference to a manager process 26 that maintains a pointer to the manager process 26 (a CORBA object). There are two types of MgrRefs: a LocalMgrRef 144 and a RemoteMgrRef 146. The LocalMgrRef 144 maintains an instance of ManagerImpl 104 (FIG. 9). Thus a local manager 144 has the implementation of the manager in the same process as the DispatcherImpl 122. For remote managers, the ManagerImpl 104 is in a separate process and is accessed through its CORBA IDL interface.

Figure 13:
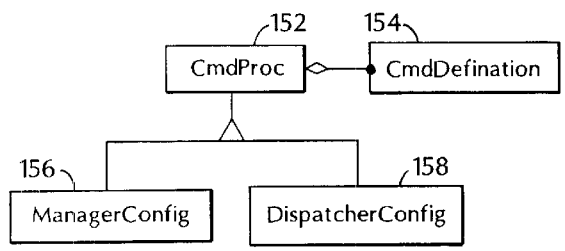

Referring now to FIG. 13, the configuration object process is shown. Both the manager process 26 and dispatcher process 22 are configurable. They both take a configuration file as a command line argument. The manager process 26 and dispatcher process 22 are configured with configuration commands. At startup the manager process 26 and dispatcher process 22 will read a file of configuration commands to establish their initial state. Once running, their configuration can be changed by sending updateConfig( ) messages with configuration commands as parameters. The current configuration of a manager process 26 or dispatcher process 22 can be queried using the getConfig( ) operation. Typically, this will return the configuration in the form of a list of commands that could be used to recreate the current configuration. The updateConfigo and getConfig( ) operations are defined in the DispatcherAdmin and Manager interfaces.

Command line tools are available to send these configuration commands to the dispatcher process 22 and manager process 26.

The configuration commands are generally of the form:
commandName <arg1><arg2>...

Each command typically returns a string suitable for a human to interpret. For most commands this string will be empty if the command was successful, and contain an error message for those that failed. For query commands such as help or getRules, the command will return the appropriate information as a string suitable for display.

The dispatcher process 22 and manager process 26 share a number of general configuration commands for managing their logs and redirecting input. These commands are documented first.

An abstract class "CmdProc" 152 parses configuration commands. It uses the class CmdDefinition 154 to represent configuration commands. The ManagerConfig 156 and DispatcherConfig 158 classes specify the CmdProc class 152 for the Manager process 26 and Dispatcher process 22, respectively. The ManagerConfig 156 and DispatcherConfig 158 instances exist only while the Manager process 26 or Dispatcher process 22 are being configured.

Figure 14:
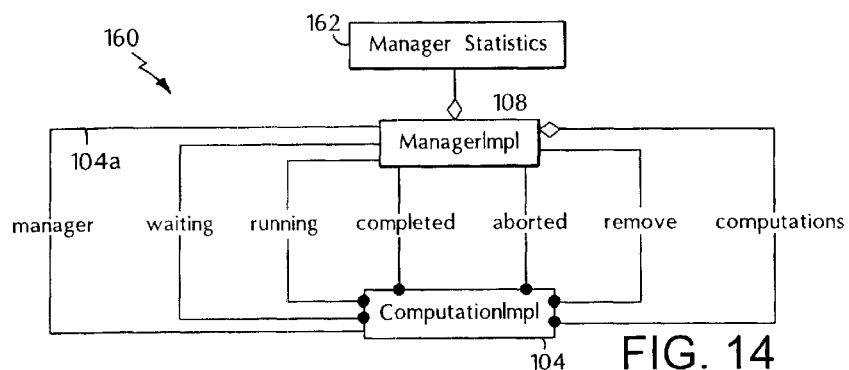

Referring now to FIG. 14, a hierarchy 160 for the ManagerImpl object is shown. The ManagerImpl object 108 maintains a number of lists of ComputationImpls 104. The computations list contains all the computations. When the ManagerImpl object 108 is destroyed, it uses the computations list to clean up all of its computations. The remaining lists are used as queues. The ManagerImpl object 108 maintains queues based on the state of the computation—waiting, running, completed, aborted, and remove. The remove list is used for computations that are ready to be removed. In order to remove an object, the client process 12' sends a remove message to the computation. The computation forwards the remove request to its manager process 26. The manager process 26 does not immediately destroy the computation, since that could result in the computation being destroyed prior to the client's 12 initial remove method call returning. Instead, the manager 26 places the ComputationImpl on the remove list. Periodically, the ManagerImpl destroys the objects in its remove list.

As shown in FIG. 14, the ComputationImpl maintains a back-pointer to its ManagerImpl. In addition, the ManagerImpl maintains a ManagerStatistics object that is used to compile statistics about the Manager (e.g., average length of time that computations wait in the queue, etc.).

Figure 15:
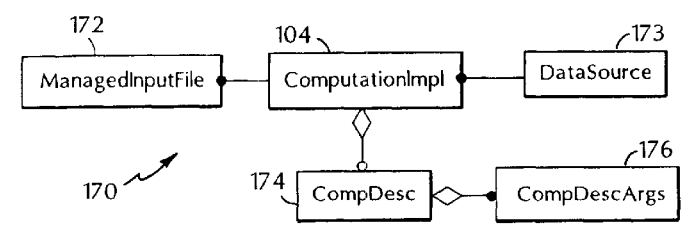

Referring now to FIG. 15, the ComputationImpl object diagram is shown. The ComputationImpl maintains a collection of ManagedInput files 172 which are optional input files for the ComputationImpl object 104. In addition, the ComputationImpl 104 maintains a collection of DataSources 173. DataSource objects 173 manage output information generated by the computation's executable. By default, the ComputationImpl has at least two DataSources—one each for Stdout and Stderr. Additional DataSources are optional. The ComputationImpl holds onto a CompDesc object 174. The CompDesc object 174 describes a computation and is used by the client process 12' to specify the computation that it is requesting. The CompDesc 174 in turn maintains a collection of CompDescArgs 176. The CompDescArgs represent the command-line arguments that will be used to invoke the computation executable.

Figure 16:
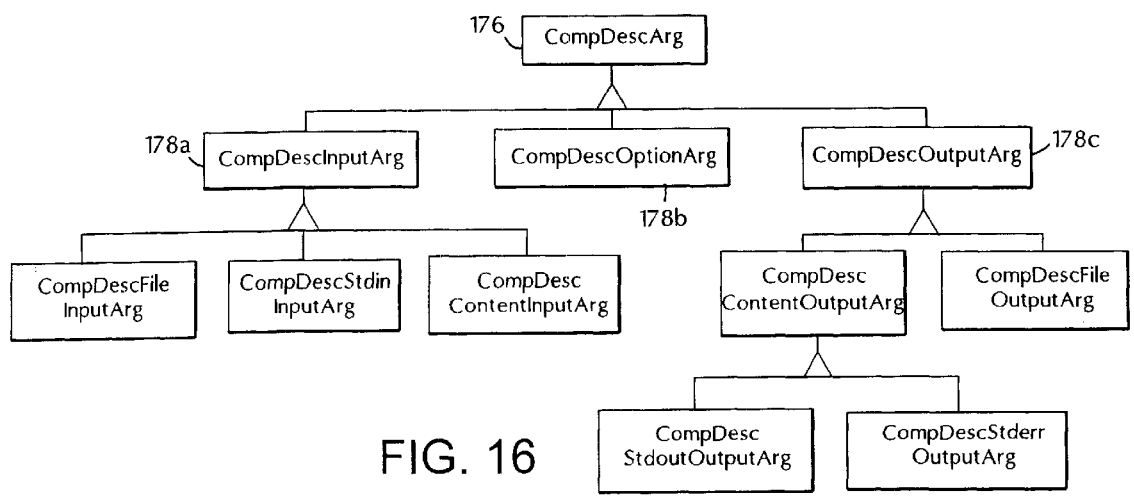

Referring now to FIG. 16, CompDescArg 176 has three subclasses, computation input descriptor arguments "CompDescInputArg" 178a, computation descriptor option arguments "CompDescOptionArg" 178b, and computation descriptor output arguments "CompDescOutputArg" 178c. "CompDescInputArg" 178a has three subclasses "CompDescFileInputArg", "CompDescStdinInputArg" and "CompContentFileInputArg". "CompDescOutputArg" 178c has two subclasses "CompDescContentOutputArg" and "CompDescFileOutputArg". "CompDescContentOutputArg" has two subclasses "CompDescStdoutOutputArg" and "CompDescStderrOutputArg".

The input arguments are used to represent the names of input files and Stdin input file streams. The output arguments are used to represent the names of output arguments and Stdout and Stderr output streams, whereas the computation descriptor option arguments are used to represent command line options which do not involve input or output to a program.

Assume that a command line executable "foo" is invoked by client 12. This executable "foo" can take some option arguments, for example, "–height=100 –width=200". The executable can take an input file and can write data to an output file, "stdout" and possibly to an error file "stderr." Thus, the complete command-line could be:

```
foo –height=100 –bar=200 –input=/var/tmp/inputfilename –
output=/var/tmp/outputfilename 1>/var/tmp/stdoutfilename 2>
/var/tmp/stderrfilename
``` where "inputfilename", "outputfilename", "stdoutfilename", and "stderrfilename" would be unique filenames generated by a Unix-type operating system.

To create a request for this command line executable using the remote computation process 20, a collection of three different command line arguments for the Computation Descriptor are produced, CompDescOptionArg, whose value would be the string "–height=100 –width=200".

A CompDescContentInputArg would be used to stream the contents of the inputfile from the client 12 to the server 14. The ComputationImpl would take the stream from the client 12, create a temporary file with a unique name, and populate the file with the contents of the stream. The name of this file would be placed in the location shown above as "inputfilename".

A CompDescContentOutputArg would be used to represent that "foo1" would write data to an output file. The ComputationImpl would create a temporary file with a unique name and the name of this file would be placed in the location shown above as outputfilename.

The ComputationImpl would also create by default an instance of CompDescStdoutOutputArg and an instance of CompDescStderrOutputArg. These would not be included in the Computation Descriptor, but would be used to capture and manage the output from Stdout and Stderr.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A machine-based method for managing and performing computational tasks, the method comprising:

passing a Computation request object from a client process to a dispatcher process;

selecting a manager process from a plurality of manager processes to receive the computation request object;

creating a computation object according to a parameter of the computation request object, such that the computation object performs a computational task, wherein the computational task includes an analysis application;

managing an execution state of the computation object by placing the computation object in a state-specific queue; and giving the client process an object reference referencing the computation object and enabling direct communication from the client process to the computation object.

2. A machine-based method for managing and performing computational tasks, the method comprising:

passing a computation request object from a client process to a dispatcher process;

selecting a manager process from a plurality of manager processes to receive the computation request object;

creating a computation object according to a parameter of the computation request object, such that the computation object performs a computational task;

managing an execution state of the computation object by placing the computation object in a state-specific queue; and giving the client process an object reference referencing the computation object and enabling direct communication from the client process to the computation object, wherein the client process accesses a result output of the computational task by using a results vendor object affiliated with the computation object.

3. A machine-based method for managing and performing computational tasks, the method comprising:

passing a computation request object from a client process to a dispatcher process;

selecting a manager process from a plurality of manager processes to receive the computation request object;

creating a computation object according to a parameter of the computation request object, such that the computation object performs a computational task, wherein the computational task includes a database loading application;

managing an execution state of the computation object by placing the computation object in a state-specific queue; and giving the client process an object reference referencing the computation object and enabling direct communication from the client process to the computation object.

4. The method of claim 3, wherein the database loading application includes loading genotype data into a database.

5. A computer system including a computation process for managing and performing resource-consuming computational tasks, the computation process comprising:

a client process to produce a computation request, said computation request invoked by a command line executable encapsulated by a script process to invoke the computation process, the computation request containing information specifying at least one computational task to be performed; and a server process to process the computation request, said server process comprising:

a remote computation manager process to manage computations, selected in accordance with the computation request and including a process to initiate a computation thread that invokes a computation request process; and a dispatcher process responsive to the computation request, to invoke the remote computation manager process.

6. A computer system including a computation process for managing and performing resource-consuming computational tasks, the computation process comprising:

a client process to produce a computation request, said computation request invoked by a command line executable and containing information specifying at least one computational task to be performed; and a server process to process the computation request, said server process comprising:

a remote computation manager process to manage computations; and a dispatcher process responsive to the computation request, to invoke the remote computation manager process, wherein said remote computation manager process comprises:

at least one computation object assigned a computation; and a queue management process, said queue management process comprising a plurality of queues that holds the at least one computation object based on a current state of the computation assigned to each computation object, such that changes to said state cause the corresponding computation objects to be moved among the queues.

a dispatcher process responsive to the computation request, to invoke the remote computation manager process.

7. The computer system of claim 6, wherein said remote computation manager process produces a computation object and the queue management process moves the computation object amongst the queues in accordance with a current state of the computation assigned to the computation object.

8. The computer system of claim 6, wherein said plurality of queues includes a queue of objects that are waiting to execute a queue for objects that are executing objects that are completed, a queue for objects that have been removed, and a queue for objects that have been aborted.

9. A computer system including a computation process for managing and performing resource-consuming computational tasks, the computation process comprising:

a client process to produce a computation request, said computation request invoked by a command line executable and containing information specifying at least one computational task to be performed; and a server process to process the computation request, said server process comprising:

a remote computation manager process to manage computations, wherein said remote computation manager process produces a computation object and includes an object manager process that manages a class of computation brokers that generate the computation object, a computation broker in the class of computation brokers generates as many computation objects as needed for a configured remote computation based on parameters in the computation request, the computation object is given an interoperable object reference to permit the client to communicate with the computation, and the remote computation manager process produces a remote computation proxy that runs in response to a client computation creation message, that executes the computation in response to a client request, and that produces a computation object of a specific logical name; and a dispatcher process responsive to the computation request, to invoke the remote computation manager process.

10. The computer system of claim 9, wherein when the computation changes state, the computation sends its status and an update message to the remote computation proxy.

11. The computer system of claim 10, wherein in response to the status and the update message, the remote computation object sends a message to the remote computation object proxy that the state of the computation has changed, and the computation object informs the application that a state change has occurred.

12. The computer system of claim 9, wherein the client process comprises a results vendor that gathers results from the remote computation that has successfully executed by asking for a named result stream.

* * * * *